United States Patent [19]

Hanson

[11] Patent Number: 4,774,737
[45] Date of Patent: Oct. 4, 1988

[54] TRAY SCRUBBER

[75] Inventor: Douglas R. Hanson, South Anoka, Minn.

[73] Assignee: Oliver Products Company, Grand Rapids, Mich.

[21] Appl. No.: 61,738

[22] Filed: Jun. 11, 1987

[51] Int. Cl.⁴ ............................................. A47L 15/39
[52] U.S. Cl. ...................................... 15/56; 15/21 R; 15/77
[58] Field of Search ................... 15/56, 77, 21 B, 88; 134/6, 9

[56] References Cited

U.S. PATENT DOCUMENTS

| | | | |
|---|---|---|---|
| 1,883,772 | 10/1932 | Engholm | 15/56 |
| 3,018,200 | 1/1962 | Huddle | 15/56 |
| 3,999,238 | 12/1976 | Hanson | 15/56 |
| 4,403,365 | 9/1983 | Hanson | 15/66 |

Primary Examiner—Edward L. Roberts

[57] ABSTRACT

A tray scrubber for plastic baked product trays or pans which automatically scrubs and cleans the bottom and sides of the tray, both on the interior and the exterior. A first pair of sides is cleaned in a first station as the tray travels along the machine and the interior of the tray is then brushed and subjected to a water spray. The tray is automatically rotated 90°, about an upright axis so that the sides that were originally leading and trailing in direction of movement are now along the edges of the conveyor moving the trays, and can be scrubbed on the exterior as well. The process is very rapid, and because it is fully automatic, can process a large number of trays for complete scrubbing in a short period of time.

10 Claims, 5 Drawing Sheets

TRAY SCRUBBER

BACKGROUND OF THE INVENTION

1. Field of the Invention.

The present invention relates to automatic scrubbers for trays for bakery products.

2. Description of the Prior Art.

Various brush-type scrubbers have been advanced in the art. For example, U.S. Pat. No. 4,403,365 shows a pan scrubber where the brushes rotate and reciprocate up and down, to insure getting bread crumbs out of baking pans. A vacuum hood and air blasts have been used for removing seeds from pans which are being scrubbed, and a vacuum hood is shown in U.S. Pat. No. 4,403,365. These hoods are primarily used in baking pans where various seeds such as sesame seeds or poppy seeds are left in the trays after the product has been baked and removed.

Power washers using high pressure nozzles and hoses have also been advanced, but these tend to leave materials that are difficult to remove, resulting in an insufficient cleaning. It has been found that it is necessary to provide some type of a brushing action across the tray surfaces to insure removing adequate material for cleaning.

Plastic trays are used for carrying baked products and these trays are set in all sorts of dirt. The products are many times delivered before a store opens so they are left outside. They get grimy and dirty. Most of the plastic trays have mesh bottoms, with relatively low height side walls and thus these walls have to be scrubbed both on the inside and outside, and the mesh bottoms also have to be scrubbed both on their interior and outer surfaces.

SUMMARY OF THE INVENTION

The present invention relates to a tray scrubber, primarily for trays which are used to carry baked and wrapped bread or other bakery products. The trays generally are rectilinear, having two first parallel spaced-apart side walls forming a pair of first side walls and two second parallel side walls that join the first side walls.

The scrubber apparatus comprises a conveyor mounted on a frame for conveying the trays with the first set of side walls parallel to the direction of travel, and with the second set of side walls or end walls perpendicular to the direction of travel. As the tray moves, the exterior of the first pair of side walls is scrubbed, using brushes on opposite sides of the tray. The brushes move inwardly toward the side walls to drive the bristles against the walls and at the same time the brushes are moving obliquely to tend to move the tray along its path of travel. The brushes are also mounted so they urge the trays against the conveyor until a satisfactory scrubbing action is obtained. This scrubbing action removes material from the outside of the walls. The trays then are carried by the conveyor to a second set of rotatable brushes positioned in sequence that brush the interior of the trays. The second brushes rotate on axes oblique with respect to the direction of travel. The axes of these two brushes are inclined in opposite directions from each other so that the interiors of the trays are scrubbed adequately. The rotating brushes are caused to bounce up and down during the rotation, to insure that the bristles will be poked into spaces in the mesh bottoms, and will have force to remove stubborn pieces of materials. A water spray can be added to aid in flushing off dirt and debris and the water can be sprayed at any location, but preferably the water is sprayed on at the location of the rotating brushes.

The apparatus then has a station for rotating the tray 90°, and at the same time scrubbing the bottom of the tray with brushes. The tray is rotated by having a stop that stops one leading corner of the tray after a control arm has dropped into the interior of the tray. The control arm pivots up as the leading one of the second set of side walls passes underneath, and once the corner that is to be stopped engages the stop, the control arm has pivoted into the interior of the tray and prevents the tray from traveling sideways as the tray is rotated 90°. The arm provides adequate control so that the brushes on the underside of the tray, which scrub the bottom, provide a force that rotates the tray in a guided path. After rotation, the first side walls now are leading and trailing with respect to the direction of travel of the tray and the second side walls are on the lateral sides of the conveyor. The conveyor moves the tray to a second side wall scrubbing station where a third set of brushes substantially identical to the first set of side wall brushes operates. The brushes in the third set are pivoted about an oblique axis so the bristles are forced against the second sides of the tray at the same time the bristles tend to move the tray forwardly in its path of travel.

Water sprays can be added at any station that is desired, and of course, dryers, vacuum hoods and the like can be added as well. The overall brushing and scrubbing action covers all surfaces of the tray, both on the interior and exterior of the first and second pairs of side walls, and the interior and exterior of the mesh bottom wall.

The bristles on the brushes are made relatively stiff, and will tend to be poked into corners and openings to insure that material in the corners of the tray is removed.

DETAILED DESCRIPTION OF THE PREFERRED EMBODIMENTS

Figure 1:
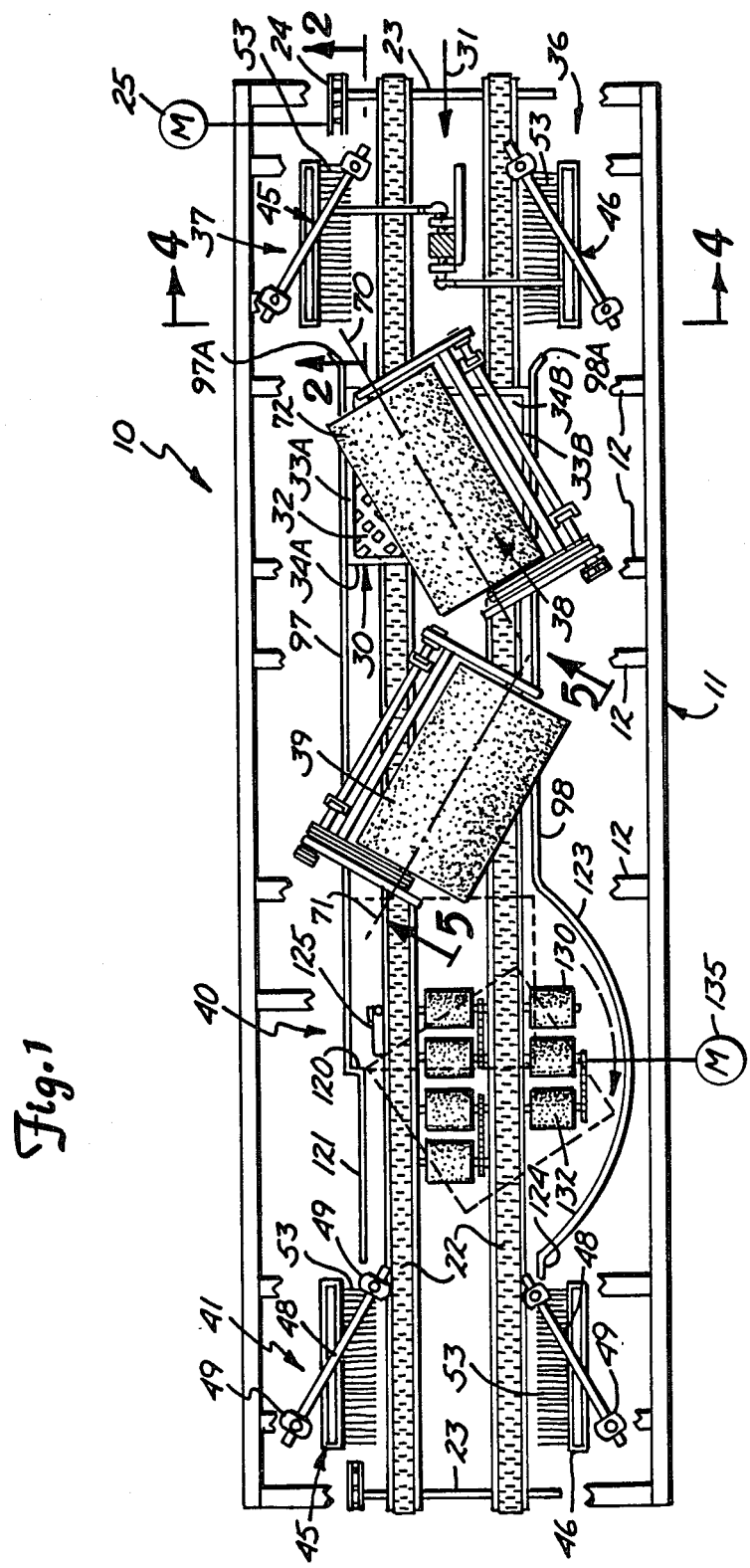
FIG. 1 is a top plan view of a bread tray cleaning machine made according to the present invention.
Figure 4:
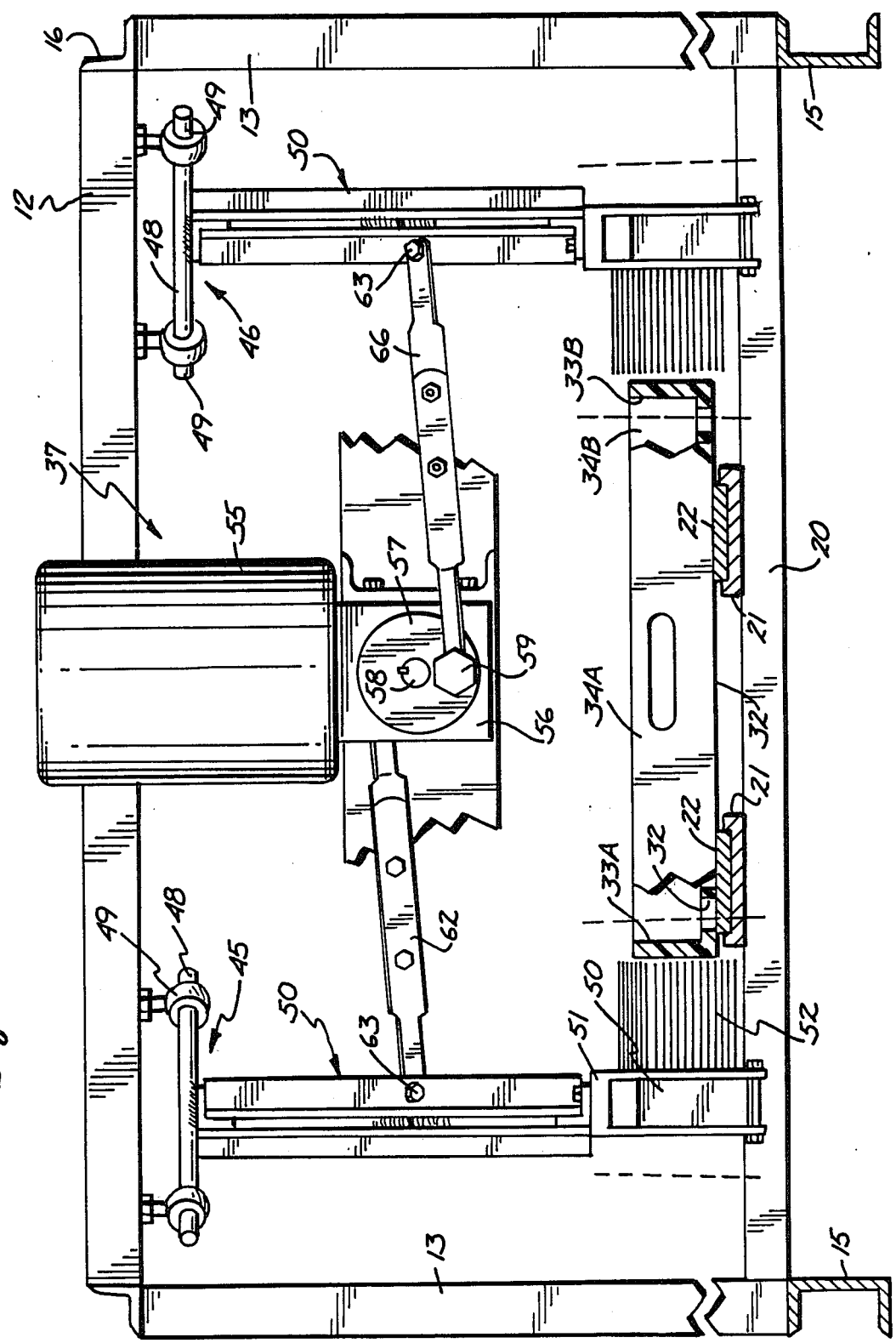
FIG. 4 is a sectional view taken as on line 4—4 in FIG. 1.

A bread tray cleaning (scrubbing) machine indicated generally at 10 in FIG. 1 has a main frame 11 which includes overhead supports that extend across the machine, and which are indicated generally at 12, and which are supported on upper longitudinally extending frame members 16 supported on vertical members indicated generally at 13 in FIG. 4. The vertical members in turn are supported on longitudinally extending frame side members 15 which are supported on suitable legs, in a conventional manner. The frame side members 15 also are joined together with lower cross members 20. The frame 11 can be any desired type of framework for supporting the various working members, and as shown in FIG. 4, lower cross members 20 are used for supporting a pair of spaced apart longitudinally extending guide tracks 21,21 which in turn support conveyor belts 22,22 that are spaced apart, are parallel, and which are positioned to run longitudinally along the frame 11 to form a tray conveyor. The conveyor belts 22 are mounted on suitable rollers mounted onto end cross shafts 23 in a conventional manner, and driven with a chain and sprocket arrangement 24 from a motor show generally at 25. The conveyor belts form a support plane that is spaced above the supports 21,21. The conveyor belts define a support for supporting and moving trays shown generally at 30 through the cleaning machine 10 in a path of travel in direction as indicated by the arrow 31.

The trays 30 include a bottom open mesh wall 32, a first pair of spaced, parallel side walls 33A and 33B, respectively, and a second pair of spaced, parallel side walls 34A and 34B, respectively, which join the side walls 33A and 33B to define a perimeter. The trays 30 are generally made of molded plastic, and the walls can have suitable hand openings or other configurations to permit them to be stacked, and still have air flow through the individual trays. These details are not shown because the trays are standard.

The second pair of side walls 34A and 34B can also be termed end walls, but the trays are rectangular in top plan view as shown in FIG. 1.

The bread tray cleaning machine of the present invention has a series of sequential cleaning or brushing stations. The trays are put on the conveyor belts 22 at an input end 36. There is a first pair of side wall cleaning brushes at a first brushing or scrubbing station 37; a second station 38 that has a bottom wall cleaning brush assembly; a third station 39 that also has a bottom wall cleaning brush; and a fourth station that comprises lower surface and tray orienting station 40, where the tray is rotated 90°, and then a fifth station 41 that has a pair of side wall cleaning or scrubbing brushes where the second set of side walls are cleaned on their exterior surface. The stations 38 and 39 also provide cleaning and brushing of the interior surfaces of the side walls, as well as the top surface of the bottom wall.

The side wall cleaning stations 37 and 41 are substantially identical in configuration and operation, and in FIG. 4, the first station 37 is shown. The last or fifth station 41 is, again, substantially the same configuration.

As shown, a suitable pair of top cross members 12,12 are positioned above the conveyor belts 22,22 and above tray 30. First and second side wall cleaning brush assemblies 45 and 46 are mounted on the cross members on opposite sides of the conveyor formed by belts 22,22 and in position to permit engagement with a tray 30 being supported on the conveyor. The brush assemblies 45 and 46 are identically constructed except that they are positioned on opposite sides of the conveyor and thus form mirror images of each other.

Figure 2:
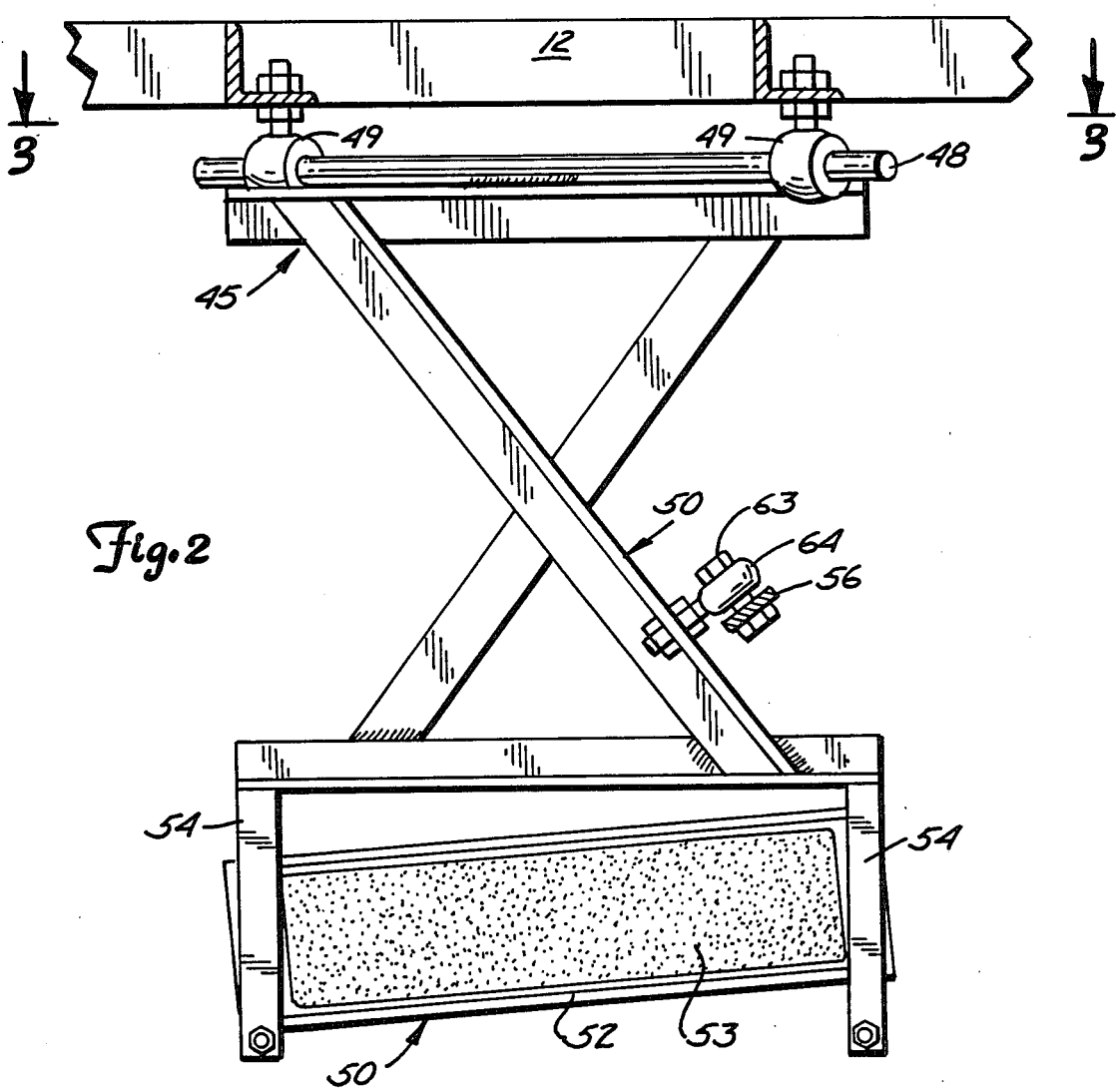
FIG. 2 is a sectional view taken as on line 2—2 in FIG. 1.
Figure 3:
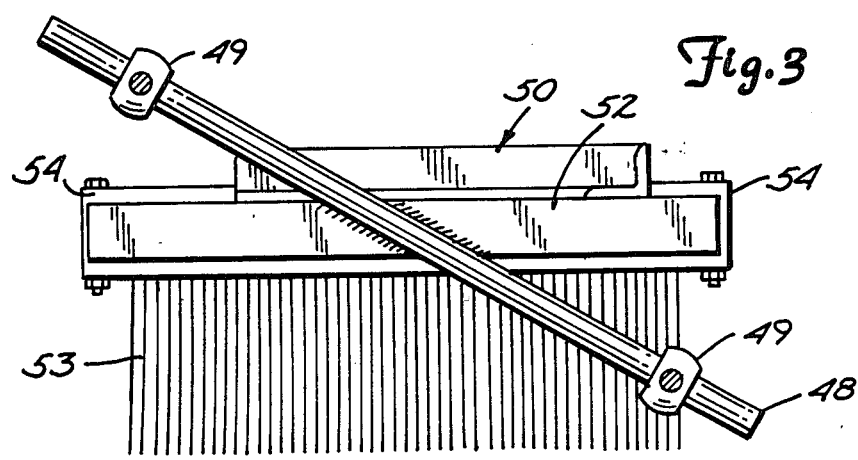
FIG. 3 is a sectional view taken as on line 3—3 in FIG. 2.

The brush assembly 45 is shown in detail in FIGS. 2 and 3. Brush assembly 46 is identically constructed. The brush assembly 45 is mounted onto a shaft 48 that is supported on suitable bearings 49,49 that are spaced in fore and aft direction, and are positioned so that the shaft axis is skewed with respect to the path of travel of the tray indicated by the arrow 31. The axis of shaft 48 is skewed at an acute angle so that the axis tapers away from the center line or central axis of the conveyor formed by belts 22,22, which defines the path of travel A brush support and actuating arm 50 is fixed to the shaft 48, so it is supported on the shaft for pivotal movement. A brush 51 is mounted at the lower end of arm 50. The brush 51 has a brush backing member 52 and elongated bristles 53 that preferably are nylon or other synthetic material. The bristles, at rest, extend generally parallel to the plane of the bottom wall of a tray 30, and thus generally parallel to the plane of support of the conveyor belts 22,22. The brushes 51 are positioned so that the plane of the brush backing member 52 is parallel to the side walls 33A and 33B of the tray 30 that is being cleaned, and thus the planes of the brushes, and the planes of the ends of the bristles are not parallel to the axes of rotation of the support shafts 48.

The center line of the brush 51 is tilted up from the plane of the conveyor and held in place by clamps 54 at the opposite ends of the brush backing member 52. The clamps 54 are supported at the lower end of the arm 50.

Because the brush assembly 46 is identically constructed to assembly 45, the numbers are the same, and it can be seen that the axis of the shaft 48 for the brush assembly 46 also has its axis tapering away from the center line of the conveyor in the direction of movement of the tray.

The brushes on both sides of a tray in the first station 37 are simultaneously reciprocated about the axes of the shafts 48, through the use of a drive motor 55 operating through a gear box 56 to drive two cranks 57 from a gear box output shaft. The motor is supported on a cross member or support 60 of suitable design that is supported back to the frame.

There are cranks 57 on both ends of the gear box output shaft 58, so that both brush assemblies 45 and 46 are driven by a separate crank 57. Each crank 57 includes a crank pin 59.

The brush assembly 45 is connected to its respective crank pin 59 through a connecting rod 62, which has its opposite end pivotally mounted on a pin 63 to a rod end bearing 64 that it in turn is fastened to the support and actuating arm 50, as can be seen in FIG. 2. This rod end bearing permits limited universal swiveling, as the connecting rod 62 and the driven actuating arm 50 are moved back and forth by the crank pin 59.

The brush assembly 46 is connected to its respective crank pin 59 with a connecting rod 66 that is also connected with a pin 63 to a rod end bearing in the same manner as shown in FIG. 2.

When the motor 55 is running, the cranks 57 are rotating and the two brush assemblies 46 and 47 will be reciprocated. Because of the inclination of the axis of pivot relative to the path of travel of a tray, the brushes will engage the first pair of side walls, and will tend to move the tray forwardly and scrub the tray sides as well. The tilting of the axis of the brush from the plane of the tray will insure scrubbing of all of the side surfaces of both side walls engaged. Because the brushes will be driven so that they are traveling at a selected speed relative to the speed of the tray, there will be a scrubbing action along the outer surfaces of the first pair of side walls. The bristles are fairly stiff so that the brushes can move in and scrub against the side walls, then retract outwardly away from the side walls and again engage the side walls one or more times as the tray moves past. The action can be controlled by the speed of rotation of the crank shaft 58 and the speed of movement of the conveyor belts 22. The brush movement is balanced so that inertial loads are not a problem.

Figure 5:
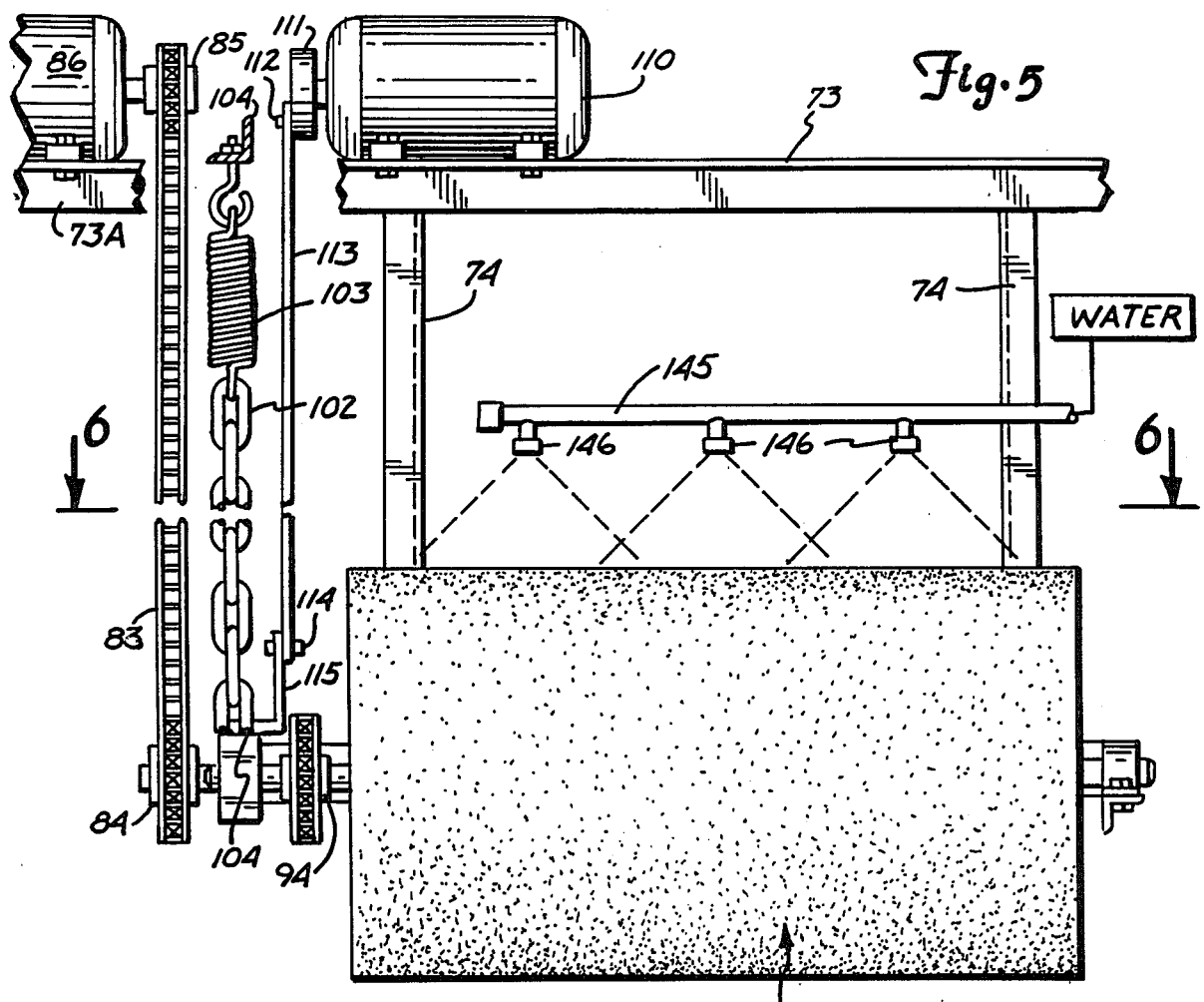
FIG. 5 is a sectional view taken as on line 5—5 in FIG. 1.
Figure 6:
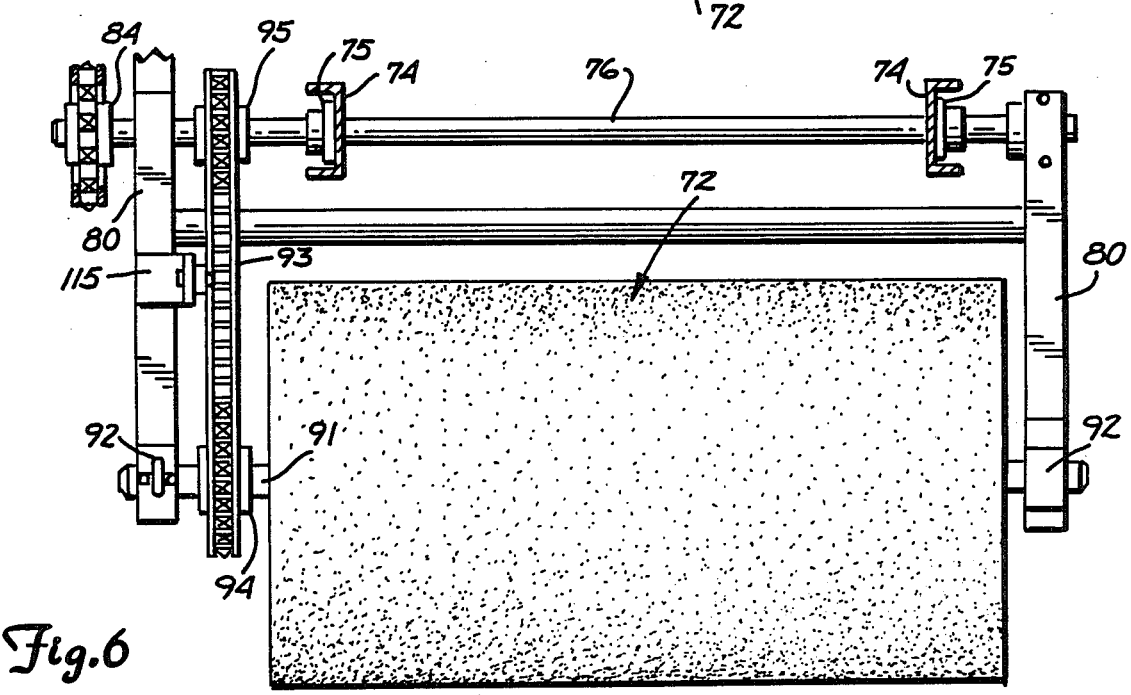
FIG. 6 is a sectional view taken as on line 6—6 in FIG. 5.

When the tray being moved in the path of movement clears the first side wall cleaning or brushing station, it enters the second station 38, where a first rotary brush is mounted. The tray is carried through station 38 to station 39. Station 38 and station 39 are identically constructed, except that the axes of the rotary brushes are inclined in an opposite sense with respect to the path of travel of the tray. These axes are shown at 70 and 71, respectively, in FIG. 1. The brushes 72, which are, again, identically constructed, can perhaps best be seen in FIGS. 5 and 6. FIGS. 5 and 6 show the brush 72 at station 39, but if FIG. 5 was taken along and parallel to the axis 70, the construction would be identical.

An overhead support shown at 73, which is a schematic representation and can comprise several cross members, support a pair of depending legs 74. The lower ends of the depending legs 74 are spaced above the trays and have bearings 75 thereon which rotatably mount a pivot shaft 76. The pivot shaft 76 has a pair of spaced arms 80,80 mounted thereon through suitable bearings shown at 81 so that the arms 80 will be free to pivot about the axis of the shaft 76 at the same time the shaft 76 rotates relative to the arms 80. The shaft 76 is driven by a chain 83 that drives a sprocket 84 on the shaft 76. Chain 83 is driven from a sprocket 85 driven by a motor 86 that is mounted onto a cross plate or member 73A. The member 73A is supported by the vertical braces 74 through suitable connectors.

The rotating brush is indicated generally at 72, and has a central shaft 91 that is mounted onto the outer ends of the arms 80 through the use of suitable bearings 92. The shaft 91 can be driven with a chain 93 that drives a suitable sprocket 94 on the shaft 91, and which is driven from a sprocket 95 that in turn is drivably mounted onto the shaft 76. Thus, when the motor 86 is powered, the brush 72 will be rotated, and in the form of the invention shown, the brush is rotated so that the lower parts of the bristles will be traveling inwardly toward the center of the conveyor and will have a forward component of movement where they contact the tray 30.

The brushes 72 in the stations 38 and 39 are independently driven and will be rotated to provide a scrubbing action. The brushes also will provide a force tending to move the tray laterally as it is moved in its path of travel by the conveyor belts 22 as well as providing a slight force for forward movement. Referring to FIG. 1, the trays 30, when they reach the brushing stations 38 and 39 are guided by side guide members 97 and 98, respectively, that react the transverse component of force from the brushes 72 in the brush stations 38 and 39 so that the tray is properly guided and held in its path of travel even though there is a lateral component of force on the tray. The guide members 97 and 98 have tapered inlet members 97A and 98A to guide the trays 30 properly.

In addition to rotating, the brush 72 in each of the brush stations 38 and 39 is made to "hop" up and down, or reciprocate. The arms 80 are spring supported to control the downward force through the use of a chain 102 mounted on a spring 103, which spring is attached to a support member 104 mounted onto one of the upper cross frame members 73. The lower end of the chain 103 is fixed as at 104 to one arm 80, and the weight of the brush can be counterbalanced by the spring 103. The string load can be adjusted as to its weight carrying capabilities.

A motor 110 is mounted on the overhead cross supports and has an output shaft that mounts a crank 111 carrying a crank pin 112 that is connected with a suitable bearing to a connecting rod 113. The connecting rod 113 in turn has a universal rod end bearing at its lower that is connected onto a pin 114 that is fixed to a bracket 115 which in turn is fixed to one of the arms 80 of the supporting respective brush. Driving the motor 110 will cause the crank to be driven, reciprocating the pin 112 and connecting rod 113, to cause the brush to pivot about the axis of the shaft 76 and hop up and down so that the ends of the bristles actually are stuck down into the mesh bottom of the tray. Such mesh bottom has openings formed as shown in FIG. 1. The bristles will clean along the sides of the members forming the mesh and also will loosen materials in the tray corners and on the inner surface of the mesh bottom.

The reciprocating, rotating brushes, acting in sequence at the stations 38 and 39 provide a brushing action that is oblique to the tray in opposite directions, and provides for brushing the side surfaces of the slats forming the mesh bottom on both sides, and also engages forcefully the interior surfaces of all of the peripheral side walls. For example, in station 38 as seen in FIG. 1, the interior surface of walls 33A and 34A would be brushed vigorously, and in station 39, the interior surfaces of walls 33B and 34B would be brushed vigorously, because of the rotation direction and rotational axis orientation of the brushes 72.

The vertical motion permits the bristles to enter into the openings in the mesh bottom and into the corners of the tray. Suitable spray nozzles 146 for water can be mounted on a pipe 145 that is above each of the brushes 72 in stations 38 and 39, if desired, for cleaning action or for rinsing as desired. The water will aid in cleaning and flushing away foreign material.

After a tray 30 has passed through the brush station 39, so that the interior surfaces of all of the side walls, and the exterior surfaces of the first pair of side walls 33A and 33B have been brushed (in station 37), the tray 30 will enter station 40, where the bottom or exterior surface of the bottom wall 32 is brushed, and at the same time, the tray will be rotated 90° to orient the tray appropriately for scrubbing or brushing the outer surfaces of the second pair of side walls 34A and 34B.

Figure 7:
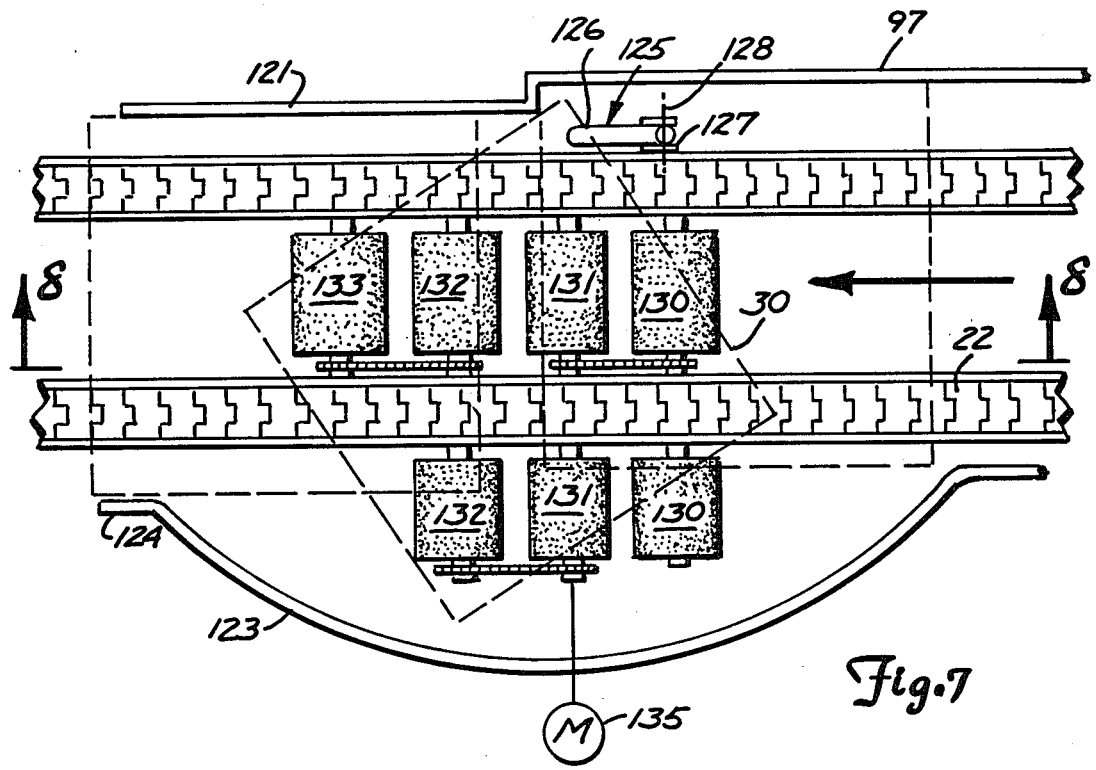
FIG. 7 is a schematic enlarged top plan view of a bread tray rotating guide member used in the cleaning machine of the present invention.
Figure 8:
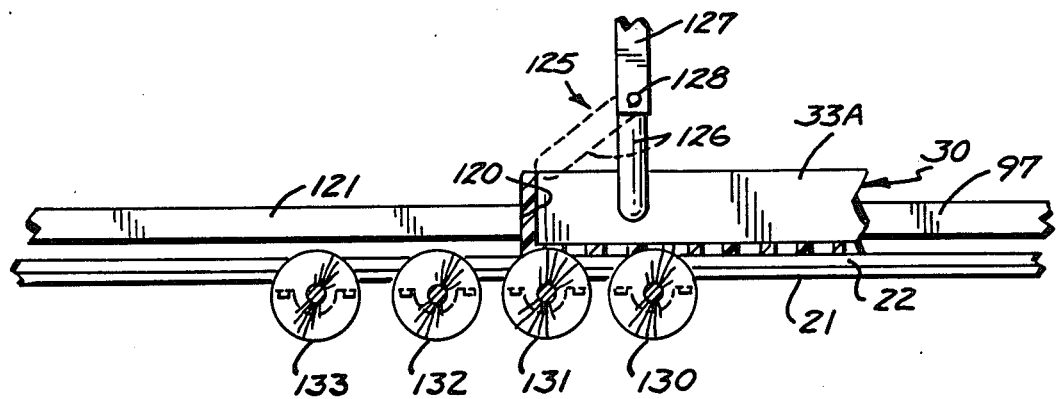
FIG. 8 is a side view of the apparatus shown in FIG. 7.

As can be seen in FIG. 1, as well as in FIGS. 7 and 8, the side guide 97 has an inturned stop flange or shoulder 120 formed therein, approximately midway through the rotation and bottom brushing station 40. An offset guide flange 121 then extends downstream from the shoulder or stop 120. The guide flange 121 is laterally offset from the flange 97.

The guide flange 98 joins a turntable-type part circular guide 123 that curves laterally in a wide sweep. A guide member 124 that is parallel to the guide 121 joins the part circular ground at a downstream end thereof.

A control arm assembly 125 is provided spaced slightly upstream, or toward the input end of the tray scrubber from the stop shoulder 120, and comprises a control arm or pin 126 that is pivotally mounted on a depending support member 127 that is supported from the overhead frame. The control arm 126 pivots about an axis that is indicated at 128. Axis 128 is perpendicular to the direction of movement of a tray in its path of travel shown by arrow 31, and thus the axis 128 is perpendicular to the central axis of the conveyor of the conveyor belts 22.

The control arm 126 can pivot upwardly about the axis 128 to clear the leading tray wall when a tray 30 is moved toward the stop shoulder 120, as shown in dotted lines in FIG. 8. As the tray 30 moves toward shoulder 120, but before the tray engages the stop shoulder, the control arm 126 will drop inside the tray 30. Note that the control arm 126 is offset from the guides 97 and 121 so that the arm can remain inside the tray when the tray is moved laterally to be in the path defined by the guide 121.

When a tray 30 is against the stop shoulder 120, the bottom of such tray is already being engaged by the first row of brushes in a series of a plurality of rotating bottom surface scrub brushes shown at 130, 131, 132 and 133 in sequence. There are two brush sections coupled end-to-end for each of the brush rows 130, 131 and 132, and there is only a single brush section at brush 133. These brushes provide a scrubbing action and a force not only to scrub the bottom surface of the tray, but also to tend to drive the tray and rotate the tray 90° as guided by the stop shoulder 120 and the control arm 126.

The brushes 130, 131, 132 and 133 are driven from a motor 135 that, for example, drives the shaft mounting the brush sections 131, and a drive is made from this shaft to the shafts driving brushes 130 and 132, and then a drive such as a chain or belt can be used for driving from the shaft for the brush 132 to the brush 133.

The brushes 130-133 have bristles extending from a central core or shaft, that engage the bottom surface of the tray 30, and because the shoulder 120 stops that corner of the tray, the action of the brush will tend to rotate the tray generally about that corner. Additionally, the control arm 126 will not allow the tray to slide sideways, since the arm can only pivot forwardly, so that the control arm 126 forms a pivot guide that insures that the tray 30 in station 40 will be held at that corner and the brushes 130-133 then act to guide the tray as it rotates as shown in FIG. 7, where a partially rotated position is represented. The continued force from the brushes 130-133 as well as the conveyor belts 22 cause the tray to continue to rotate as guided by the control arm 126 and part circular portion 123.

The brushes 130-133 then continue to drive the tray, so that it makes a full 90° swivel. The second pair of side walls 34A and 34B are then positioned parallel to the path of travel, with one of the second set of side walls, namely wall 34A against the guide wall 121. The brushing or scrubbing of the exterior of the bottom wall of the tray has been completed substantially, and the brushes 132 and 133 will continue to engage the bottom of the tray as it is moved toward the last brushing or scrubbing station 41. The guide member 124 aids in holding the tray properly oriented as it exits the rotation and bottom brushing station 40. The control arm 126 will pivot to the left over the side wall 33A as the tray moves out of the station 40.

The side brushes in station 41 operate in the same manner as the brushes in the station 37, except that in this case the brushes will be scrubbing or brushing the outer surfaces of the second pair of side walls 34A and 34B. The brush construction is the same, so the forces from the brush assemblies 45 and 46 in the station 41 is downwardly and forwardly, to complete the scrubbing action.

It should also be again mentioned that the control arm does not permit side motion of the tray toward part circular guide wall 123 during the rotation of the tray 30 in station 40, to thereby insure that the tray will be properly rotated to its position for continued travel to the last brush station 41.

The trays are brushed adequately and thoroughly on all surfaces, and this is done automatically. As previously stated, pressure washer lines, if desired, can be used as well. The overhead spray bar 145 at stations 38 and 39 can be supplemented with side spray bars if desired.

Although the present invention has been described with reference to preferred embodiments, workers skilled in the art will recognize that changes may be made in form and detail without departing from the spirit and scope of the invention.

What is claimed is:

1. A tray scrubber comprising:
   a frame;
   means for moving a tray to be scrubbed in a path of travel along the frame, said tray having a generally rectilinear shape with a pair of spaced apart first sides, and a pair of spaced apart second sides and oriented so that the pair of first sides are generally parallel to the direction of the path of travel;
   first brush means for engaging the outer surfaces of the first pair of sides of a tray moving in such path, said brush means having bristles that travel obliquely with respect to the path of travel to engage the sides of a tray being moved in the path of travel to tend to move such tray in the direction of normal movement of such tray and simultaneously applying a force on the bristles laterally against the opposite sides of the first pair of sides of such tray;
   second brush means for engaging and brushing the interior surfaces of a tray as such tray is moved in its path subsequent to operation thereon of the first brush means;
   means for rotating a tray being moved in the path 90°, to place the second pair of sides of such tray parallel to the path of movement; and
   third brush means for engaging the second pair of sides of the tray, said third brush means having bristles that travel obliquely with respect to the path of travel to engage the sides of a tray being moved in the path of travel to tend to move such tray in the direction of normal movement of such tray and simultaneously applying a force on the bristles laterally against the opposite sides of the second pair of sides of such tray.

2. The apparatus as specified in claim 1 wherein said means for rotating a tray 90° comprises a stop for engaging a leading corner of a tray moving in the path of travel, a control arm movable into the interior of a tray adjacent the stop, fourth brush means for brushing the bottom of a tray positioned below the conveyor and engaging a tray that is against said stop with the control arm on the interior of such tray, said brush means providing a force tending to move such tray in its normal direction of movement, while held by the stop means and arm, whereby one corner of such tray is restrained while the other corners of such tray swivel about the one corner to position such tray 90° from its original orientation.

3. The apparatus as specified in claim 2 wherein said control arm is pivotally mounted about an axis generally perpendicular to the path of travel, and is restrained from movement in any direction other than about said axis, said control arm thereby preventing a tray in which the control arm is located from moving laterally more than a selected amount with respect to the path of travel.

4. The appparatus as specified in claim 2 wherein said frame includes laterally spaced guide walls in a first portion of the path of travel of a tray being cleaned to guide the tray, said stop comprising an off-set wall directed inwardly from one of the lateral guide walls, and second guide walls for guiding a tray in a second portion of travel after the tray has passed the means for rotating a tray 90°, said second path of travel being laterally off-set from the first path of travel and parallel thereto.

5. The apparatus as specified in claim 1 wherein said second brush means for brushing the interior of a tray comprises at least one brush obliquely mounted with respect to the path of travel, and above a tray moving in the path of travel; and means for reciprocating said brush toward and away from a tray moving in the path of travel a selected amount and at a selected speed.

6. The apparatus as specified in claim 2 wherein said first and third side brush means are mounted on pivot shafts that are inclined with respect to the path of travel, and have a component of movement in direction of movement of trays moving in the path of travel as well as a component of movement laterally inwardly toward the sides of a tray in the path of travel.

7. The apparatus as specified in claim 6 and means for reciprocating said first and third side brush means about their axes of pivot, said first and third side brush means each including a pair of brushes that are directly oppositely positioned with respect to the conveyor, and positioned on opposite sides of a tray carried by said conveyor.

8. A scrubber for flat members which have upright side walls comprising:
a frame;
means for moving a member to be scrubbed in a path of travel along the frame with at least one upright side wall of such member generally parallel to the path of travel; and
brush means for engaging the one side wall of a member moving in such path said brush means having bristles that travel obliquely with respect to the path of travel to engage the one side to tend to move such member in the direction of normal movement of such member and simultaneously applying a force on the bristles laterally against the one side of such member.

9. The scrubber of claim 8 wherein a member to be scrubbed has two upright sides which are spaced apart and generally parallel, the brush means including separate brushes on opposite sides of the path of travel positioned to substantially simultaneously engage both of the two upright side walls.

10. The scrubber of claim 9 wherein a member to be scrubbed has third and fourth upright side walls positioned at 90° to the first two sidewalls and wherein said scrubber includes:
means for rotating a member being moved in the path of movement 90°, to place the second, third and fourth side walls of such member parallel to the path of movement, said means for rotation being positioned in the path of movement subsequent to the position of the first mentioned brush means in the path of travel; and
second brush means for engaging the third and fourth side walls of a tray in the path of travel, said second brush means being mounted substantially identically to the first brush means.

* * * * *

UNITED STATES PATENT AND TRADEMARK OFFICE
CERTIFICATE OF CORRECTION

PATENT NO. : 4,774,737

DATED : October 4, 1988

INVENTOR(S) : Douglas R. Hanson

It is certified that error appears in the above-identified patent and that said Letters Patent is hereby corrected as shown below:

Column 10, line 9, after "path", insert --,-- (comma).

Column 10, line 34, delete "tray" and insert --member--.

Signed and Sealed this

Twenty-eighth Day of February, 1989

Attest:

DONALD J. QUIGG

*Attesting Officer*  *Commissioner of Patents and Trademarks*